(12) United States Patent
Ishiguri et al.

(10) Patent No.: US 6,238,728 B1
(45) Date of Patent: May 29, 2001

(54) MIXED FEED WITH AN AMINO ACID

(75) Inventors: Toshihiko Ishiguri; Minoru Kida; Kazuhiko Mori; Hisao Ito, all of Kanagawa (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 09/580,421

(22) Filed: May 30, 2000

(30) Foreign Application Priority Data

May 28, 1999 (JP) .................................................. 11-150523

(51) Int. Cl.[7] .............................. A23K 1/16; A23K 1/18
(52) U.S. Cl. .......................... 426/656; 426/635; 426/807
(58) Field of Search .................... 426/656, 635, 426/807

(56) References Cited

U.S. PATENT DOCUMENTS

| | | | |
|---|---|---|---|
| 4,919,945 | * 4/1990 | Spindler et al. | 426/69 |
| 4,929,600 | * 5/1990 | Cogburn | 514/2 |
| 5,145,695 | * 9/1992 | Smith et al. | 426/2 |
| 5,728,675 | * 3/1998 | Schaefer et al. | 514/2 |
| 5,846,581 | * 12/1998 | Catron | 426/74 |
| 5,871,773 | * 2/1999 | Rode et al. | 424/438 |
| 6,039,952 | * 3/2000 | Sunvold et al. | 424/195.1 |

FOREIGN PATENT DOCUMENTS

0182117 * 5/1986 (EP) .

* cited by examiner

Primary Examiner—Chhaya D. Sayala
(74) Attorney, Agent, or Firm—Oblon, Spivak, McClelland, Maier & Neustadt, P.C.

(57) ABSTRACT

An amino acid-enriched feed, industrially produced mixed feed or premix thereof which is obtainable by mixing (a) a feed raw material containing predominantly at least one feed component selected from the group consisting of corn gluten meal powder, corn gluten feed powder and an intermediate product thereof, said intermediate product being one obtained in a corn wet milling step with (b) an amino acid fermentation broth containing 3 to 80% by weight of an amino acid or its treated solution and thereafter drying the resultant mixture or by conducting drying during mixing of the raw materials (a) and (b). It has improved powder characteristics in flowability and homogeneity of the mixing components as compared with the case that crystalline amino acid is used as feed additive.

7 Claims, 2 Drawing Sheets

MIXED FEED WITH AN AMINO ACID

BACKGROUND OF THE INVENTION

1. Field of the Invention

The present invention relates to an amino acid-enriched feed, industrially produced mixed feed or premix thereof which comprises using an amino acid fermentation broth or its treated solution (amino acid containing solution or suspension originating in an amino acid fermentation broth).

2. Description of the Background

Industrially produced mixed feed for various agriculturally useful animals or livestock (such as pig and poultry) is composed of various individual feeding materials (e.g. cereals, brans, vegetable oil meals, animal feeds, corn gluten meal (hereinafter, referred to as "CGM"), corn gluten feed (hereinafter, referred to as "CGF"), cane sugar molasses, starch cake, feed additives and the like). The composition of amino acids present in the feed causes great influence on the growth of animals. Usually L-lysine, L-threonine and L-tryptophane become limiting amino acids although they are dependent on the compounding ratio of individual components in the mixed feed. So industrially produced crystalline amino acids have been used as additives to the feed.

Amino acids such as L-lysine hydrochloride, L-threonine, L-tryptophane, etc. which are currently used as feed additive are prepared by fermentation thereby crude broth containing amino acid, inorganic salts, microorganism, saccharides, etc. is obtained, and the desired amino acid is separated from the broth, for example, by an ion-exchange resin treatment and crystallization processes. According to such processes the desired amino acid may be obtained in high purity. However, the processes have the disadvantage that installation investment is big and expensive sub-raw materials need to be used.

Amino acids for use as feed additive are not always required to have high purity as stated above. So, many attempts have also been made to utilize as feed additive a granular composition obtained directly from an amino acid fermentation broth or its treated solution by concentration, drying and granulation. As disclosed in e.g. French Patent Application Publication No. 2,217,347, Japanese Patent Laid-Open Nos. Sho 56-35962 (35962/1981) and Hei 5-192089 (192089/1993), dry composition containing amino acid for use as feed additive may be easily and cheaply obtained.

Although the above two processes are intended to prepare amino acid feed additive as solid material, they have a common problem as stated below. That is, although the compounding ratio of the amino acid feed additive to the mixing feed components must be set so as to become the amino acid content required depending on the age of animal to be fed, as a rule it is as very low as about 0.1 to 0.3% by weight. In addition, because the grain size distribution varies it is difficult to obtain a mixed feed having homogeneous quality by mechanical mixing procedure.

Also, for the feed industry handling an enormous amount of powdered and granular raw materials, an improvement in the powder characteristics of the powdered and granular raw materials has been required. For example, powdered CGM and CGF have characteristics that they have low bulk density and poor flowability and are apt to fly, and accordingly they have been required to improve their particle property from standpoint of view of transport cost and handling property.

SUMMARY OF THE INVENTION

An object of the present invention is to obtain cheaply a feed, industrially produced mixed feed or premix thereof which has two characteristics as stated below.

① To disperse an amino acid more uniformly in feed as compared with the case that the hitherto used solid amino acid feed additive is mixed with a feed.

② To have better powder characteristics as compared with the case that the hitherto used solid amino acid feed additive is mixed with a feed.

As a result of having ardently studied to achieve the above object, the present inventors have found that there can be obtained a feed, industrially produced mixed feed or premix thereof wherein an amino acid is uniformly dispersible and which has an improved powder characteristics by mixing (a) CGM powder or CGM powder (or their intermediate products produced during a corn wet milling step) with (b) an amino acid fermentation broth or its treated solution and thereafter drying the resultant mixture, alternatively by conducting drying during mixing of the raw materials (a) and (b).

That is, the present invention is an amino acid-enriched feed, industrially produced mixed feed with an amino acid or premix thereof which is obtainable by mixing (a) a feed raw material containing predominantly at least one feed component selected from the group consisting of CGM powder and CGF powder with (b) an amino acid fermentation broth containing 3 to 80% by weight of an amino acid or its treated solution and thereafter drying the resultant mixture or by conducting drying during mixing of the raw materials (a) and (b).

DESCRIPTION OF THE PREFERRED EMBODIMENTS

Figure 1:
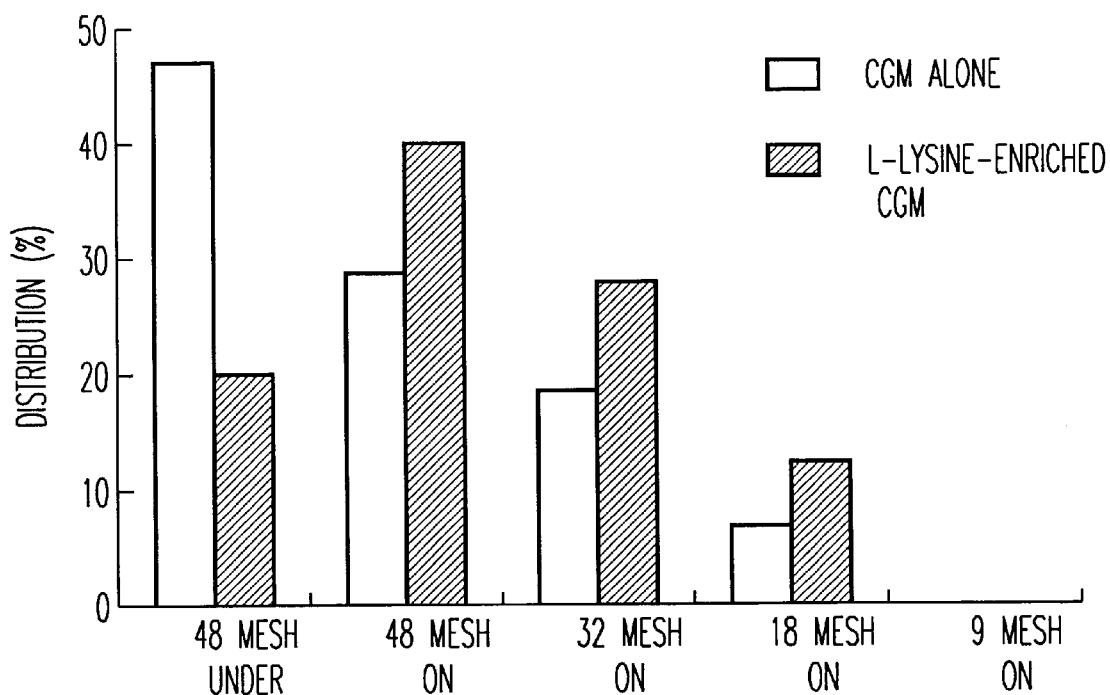
FIG. 1 is a graph showing grain size distribution of L-lysine-enriched CGM of Example 1.

In the present invention, the intended feed, industrially produced mixed feed or premix thereof may be obtained by mixing (a) CGM powder or CGF powder either of which has been used in a large amount as the predominant component for feed and industrially produced mixed feed with (b) an amino acid fermentation broth or its treated solution and thereafter drying the mixture, or by conducting drying during mixing of the raw materials (a) and (b).

The intended feed, industrially produced mixed feed or premix thereof may also be obtained even by mixing (a) an intermediate product of CGM powder or CGF powder which may be obtained in a corn wet milling step with (b) an amino acid fermentation broth or its treated solution and thereafter drying the resultant mixture, or by conducting drying during mixing of the raw materials (a) and (b).

Furthermore, other components of the feed (such as bran, corn, barley, soybean meal and the like) may be added to CGM powder or CGF powder and mixed with an amino acid fermentation broth or its treated solution, and subsequently the resultant mixture is dried, or a drying is conducted during the mixing step whereby industrially produced mixed feed may be obtained.

The amino acid content in the amino acid fermentation broth or its treated solution for use in the present invention may be 3 to 80% by weight. As the amino acid, L-lysine, L-threonine, L-tryptophane or various salts of these amino acids and mixture thereof may be taken. Examples of the amino acid fermentation broth and its treated solution include solution containing other saccharides, microorganism and inorganic salts than amino acid like fermentation broth, the solution free from microorganism which may be obtained by removing microorganism from the fermentation broth by a means such as centrifugal separation and membrane filter, an amino acid-containing solution which may be obtained from the fermentation broth by purification with an ionic exchange resin, amino acid mother liquor from which amino acid has been crystallized out, the concentrate of these amino acid-containing solutions and an amino acid slurry. And, the amino acid fermentation broth and its treated solution exemplified in the above may be ones containing further trace components such as minerals, vitamins, antibiotics, etc. which have been usually used in preparing industrially produced mixed feed.

In the present invention, an intermediate product of CGM or CGF which may be obtained in a corn wet milling step may be used as well as CGM powder, CGF powder or mixture thereof. In the corn wet milling step, corn raw material is immersed in a nitrous acid solution and thereafter germ, husk and fibers are separated out. The residual solution is called as milled starch and contains 5 to 8% of protein with a small amount of starch. Subsequently protein and starch present in milled starch are separated from each other with a centrifugal separator, thereby protein is recovered as light solution. This light solution contains about 60~70% of protein and about 1.5~2.0% of solid matters, and usually it is further concentrated and filtered out to recover wet solid matter, which is dried with a drying equipment such as a drum dryer or a flash dryer to prepare CGM. The terms "an intermediate product of CGM powder" referred to herein mean the light solution obtained after the centrifugal separation of milled starch, concentrate thereof and the wet solid matter obtained after filtration. Also, the germ, husk and fibers separated from corn are dehydrated, mixed with cornsteep liquor (an immersion solution formed when corn is immersed in a nitrous acid solution) and dried with a drying equipment such as a flash dryer to obtain CGF powder. The terms "an intermediate product of CGF powder" referred to herein mean the dehydrated germ, husk and fibers.

In the present invention, (a) feed raw material such as CGM, CGF powders or intermediate product of CGM powder or CGM powder obtained in corn wet milling step is mixed with (b) the amino acid fermentation broth or its treated solution and thereafter the resultant mixture is dried, or the drying is conducted during mixing of (a) and (b) raw materials. These procedures are operated as shown below.

In case that a drying is conducted after mixing CGM powder or CGF powders and the amino acid fermentation broth or its treated solution, CGM powder or CGF powders may be mixed the amino acid fermentation broth or its treated solution in advance with a usual mixer such as a ribbon mixer, Nauta mixer, an air mixer, a paddle mixer, a flash mixer, a static mixer, V-type mixer, S-type mixer, a double cone mixer, a horizontal type high-speed agitation mixer, a vertical type high-speed agitation mixer or a rotary drum mixer. In this case, since the amino acid fermentation broth or its treated solution has somewhat tacky nature, fine particles present in CGM or CGF powder are granulated. Subsequently the mixed material is dried with a specific dryer such as a flash dryer, a fluidized bed dryer, a drum dryer or a agitation dryer. The use of these dryers is intended to place the mixed material in a moving state by their operation in order to prevent it becoming coarse grains or lumps.

In case that the drying is conducted during mixing of CGM powder or CGF powders with amino acid fermentation broth or its treated solution, while CGM powder or CGF powder is moved by a dryer such as a fluid bed dryer, a drum dryer or a agitating dryer, the amino acid fermentation broth or its treated solution is directly introduced thereto. The amino acid fermentation broth or its treated solution acts as binder for granulation, and drying is conducted as the granulation of fine powder (the so-called fluidized bed granulation, agitation granulation) proceeds.

In case that a light solution obtained after by centrifugal separation of milled starch or its concentrated solution is used as the intermediate product of CGM, the following processes may be applied:

① Light solution or its concentrated solution is first mixed with the amino acid fermentation broth or its treated solution and then the resultant mixture is dried directly. ② the drying is conducted after or during mixing of light solution or its concentrated solution, the amino acid fermentation broth its treated solution or mixed solution thereof and further seed crystals as defined below. In the case of ① process, a spray dryer, a drum dryer or a spin flash dryer may be employed. In the case of ② process, a part of the finished product obtained after the final drying had been conducted is recycled as the seed crystal and mixed with the solution stated previously in a mixer, and thereafter dried with a flash dryer, a fluidized bed dryer, a drum dryer or a agitation dryer. Alternatively, a part of the finished product is recycled in dryer such as fluid bed dryer, drum dryer or agitating dryer, while the dryer is operated the solution stated previously is introduced in the dryer to effect drying. Usual operation condition may be applied.

In case that wet solid matter (obtained from a light solution by concentration and filtration said light solution being obtained after centrifugal separation of the milled starch) is used as the intermediate product of CGM, it is mixed with the amino acid fermentation broth or its treated solution and then the resulting mixture is dried or drying is conducted during their mixing according to similar manner as in the case that CGM powder is used. There may be employed the same mixing and drying machines as in the case that CGM powder is used.

In case that germ, husk and fibers which has been separated from corn are the intermediate product of CGF are used, they are mixed with cornsteep liquor together with the amino acid fermentation broth or its treated solution, and then dried. The details of the process and combination are as follows.

CGF intermediate product→to be mixed with cornsteep liquor (CSL)→to be mixed with the amino acid fermentation broth or its treated solution→to be dried CGF intermediate product→to be mixed with the amino acid fermentation broth or its treated solution→to be mixed with CSL→to be dried CGF intermediate product→to be mixed with CSL and the amino acid fermentation broth or its treated solution→to be dried CGF intermediate product→to be mixed with CSL→to be dried while CSL and the amino acid fermentation broth or its treated solution is mixed together CGF intermediate product→to be mixed with the amino acid fermentation broth or its treated solution→to be dried while the amino acid fermentation broth or its treated solution and CSL is mixed together CGF intermediate product→to be dried while CSL and the amino acid fermentation broth or its treated solution are mixed together There may be employed the same mixing and drying machines as in the case that CGF powder is employed.

According to the present invention, the following advantages may be secured as compared with the case that crystalline amino acid is used as feed additive.

The enrichment of an amino acid may be conducted by mixing CGM powder, CGF powder or the intermediate products of CGM or CGF obtained in the corn wet milling step is mixed with the amino acid fermentation broth or its treated solution and then the resultant mixture is dried, or drying is conducted during the mixing stage whereby amino acid may be more uniformly dispersed in the feed in comparison with the case that a crystalline amino acid is mixed.

The enrichment of an amino acid may be conducted by mixing CGM powder, CGF powder or the intermediate products of CGM or CGF obtained in a corn wet milling step is mixed with the amino acid fermentation broth or its treated solution and then the resultant mixture is dried, or drying is conducted during the mixing stage, whereby the content of fine particles may be decreased with uniformity of grain size so that the bulk density of CGM powder or CGF powder may be increased. That is, according to the present process handling property of CGM powder or CGF powder is improved to such extent that transport cost for it may be reduced.

The following examples illustrate the present invention in more details.

EXAMPLE 1

A culture medium (pH of 7.0) containing 80 g/L of waste cane sugar molasses (as sugar), 50 g/L of ammonium sulfate, 1 g/L of $KH_2PO_4$, 1 g/L of $MgSO_4 \cdot 7H_2O$, 10 mg/L of soybean protein hydrolyzate (as nitrogen), 0.1 mg/L of thiamine hydrochrolide, 50 g/L of calcium carbonate and 0.3 mg/L of biotin was seeded with a strain of *Brevibacterium lactofermentum* A,112593 (FERM BP-3240) and cultivated at 31.5° C. for 72 hours under stirring to prepare a fermentation broth of L-lysine sulfate.

As CGM a commercial one was used. According to standard tables of feed composition in Japan, the weight ratio of L-lysine to crude protein in CGM is 1.73.

An experiment for enrichment of L-lysine to CGM was conducted by adding the L-lysine sulfate fermentation broth to CGM powder. The enrichment of L-lysine was targeted to such an extent that the weight ratio of L-lysine to crude protein becomes above 6.31 as compared to that in soybean cake. That is, the L-lysine sulfate fermentation broth was added to CGM powder in an amount such that the weight ratio of L-lysine to crude protein with respect to the resultant L-lysine-enriched CGM becomes above 10%. A fluidized bed agitation granulator ("SPIR-A-FLOW-mini", a product of FREUND INDUSTRIAL CO., Ltd.") was used for the L-lysine sulfate fermentation broth to be added, mixed and dried. It was added as shown below. 500 Grams of CGM powder was fed into the fluidized bed and then an inlet air flow rate and a exhaust air flow rate were adjusted so as to form CGM in a good fluidized state. And, the L-lysine sulfate fermentation broth was sprayed thereto with a two-fluid nozzle. The spraying was continued until the weight ratio of L-lysine to crude protein in the L lysine-enriched CGM became above 10% as stated previously.

The operating conditions for the SPIR-A-FLOW-mini were as follows:
Hot air temperature: 100° C.
Fluidized bed temperature: 45~50° C.
Exhaust damper opening degree: 6→9 (in the equipped scale)
Fluid intake damper opening degree: 6→10 (in the equipped scale)
Slit intake damper opening degree: 10 (in the equipped scale)
Rotation speed of rotor: 400 rpm
Rotation speed of agitator: 1200 rpm
Rotation speed of lamp breaker: 4000 rpm Crystalline L-lysine hydrochloride-added CGM the preparation of which was conducted by mixing CGM and L-lysine hydrochloride together in dried and powdered state was used as a control sample for evaluating the dispersibility, flowability and bulk density of L-lysine-enriched CGM which was obtained by this means.

Samplings were done at ad lib five places from each of the L-lysine sulfate fermentation broth-added CGM and the control CGM, and the L-lysine concentration in the respective samplings was analyzed. The analysis results are shown in table 1.

TABLE 1

| | Amount of L-lysine (Weight Amount of L-lysine Base Feed) | |
| --- | --- | --- |
| | Addition of L-lysine Sulfate Fermentation Broth | Control (Addition of Crystalline L-lysine Hydrochloride) |
| Sampling 1 | 6.9 | 6.6 |
| Sampling 2 | 6.9 | 6.8 |
| Sampling 3 | 6.9 | 8.2 |
| Sampling 4 | 7.1 | 7.0 |
| Sampling 5 | 6.9 | 7.4 |
| Average | 6.9 | 7.2 |
| Standard Deviation | 0.089 | 0.63 |

In that case that L-lysine sulfate fermentation broth was added to CGM powder, amino acid was dispersed more homogeneously in CGM in comparison with the case that crystalline L-lysine hydrochloride was added to CGM powder.

FIG. 1 indicated grain size distribution of L-lysine-enriched CGM. Its bulk density and angle of repose are shown in table 2. As can be seen from FIG. 1 and table 2, the content of a very fine particle is decreased and the angle or repose becomes low, indicating that L-lysine-enriched CGM has an improved handling property in comparison with the control sample. Also, it has greater bulk density than control sample and therefore transport cost for it can be reduced.

TABLE 2

| | L-lysine Sulfate Fermentation Broth-CGM | CGM alone |
| --- | --- | --- |
| Angle of Repose (degree) | 39 | 46 |
| Bulk Density (g/cc) | 0.71 | 0.67 |

EXAMPLE 2

An experiment for enrichment of L-lysine to CGF was conducted by adding the fermentation broth of L-lysine sulfate to CGF powder. There was used the same L-lysine sulfate fermentation broth as in Example 1.

As CGF a commercial one was used. According to standard tables of feed composition in Japan, the weight ratio of L-lysine to crude protein in CGF is 3.47.

Next, L-lysine sulfate fermentation broth was added to CGF powder to conduct an experiment for L-lysine enrichment. In this case, L-lysine enrichment was targeted to such an extent that the weight ratio of L-lysine to crude protein in the resulting L-lysine-enriched CGF became above 10% like Example 1. A fluidized bed agitation granulator ("SPIR-A-FLOW-mini", a product of FREUND INDUSTRIAL, Co., Ltd.") was used for the L-lysine sulfate fermentation broth to be mixed, dried and granulation. It was added as shown below. 500 Grams of CGF powder was fed into the fluidized bed and then an inlet air flow rate and a exhaust air flow rate were adjusted so as to form CGF in a good fluidized state. And, the L-lysine sulfate fermentation broth was sprayed thereto with a two-fluid nozzle. The spraying was continued until the weight ratio of L-lysine to crude protein in the lysine-enriched CGF was attained to above 10% as stated previously. The operating conditions for the SPIR-A-FLOW-mini were the same as those in Example 1.

Crystalline L-lysine hydrochloride-added CGF the preparation of which was conduced by mixing CGF and L-lysine hydrochloride together in dried and powdered state was used as a control sample for evaluating the dispersibility, flowability and bulk density of L-lysine-enriched CGF which was obtained by this method.

Samplings were done at ad lib five places from each of the L-lysine sulfate fermentation broth-added CGM and the control CGM, and the L-lysine concentration in the respective samplings was analyzed. The analysis results are shown in table 3.

TABLE 3

| | Amount of L-lysine (Weight Amount of L-lysine Base Feed) | |
|---|---|---|
| | Addition of L-lysine Sulfate Fermentation Broth | Control (Addition of Crystalline L-lysine Hydrochloride) |
| Sampling 1 | 1.9 | 1.6 |
| Sampling 2 | 2.1 | 2.2 |
| Sampling 3 | 1.8 | 2.6 |
| Sampling 4 | 1.9 | 2.3 |
| Sampling 5 | 2.0 | 1.8 |
| Average | 1.9 | 2.1 |
| Standard Deviation | 0.11 | 0.4 |

In the case that L-lysine sulfate fermentation broth was added to CGF powder, amino acid was dispersed more homogeneously in CGF in comparison with the case that crystalline L-lysine hydrochloride was added to CGF powder.

Figure 2:
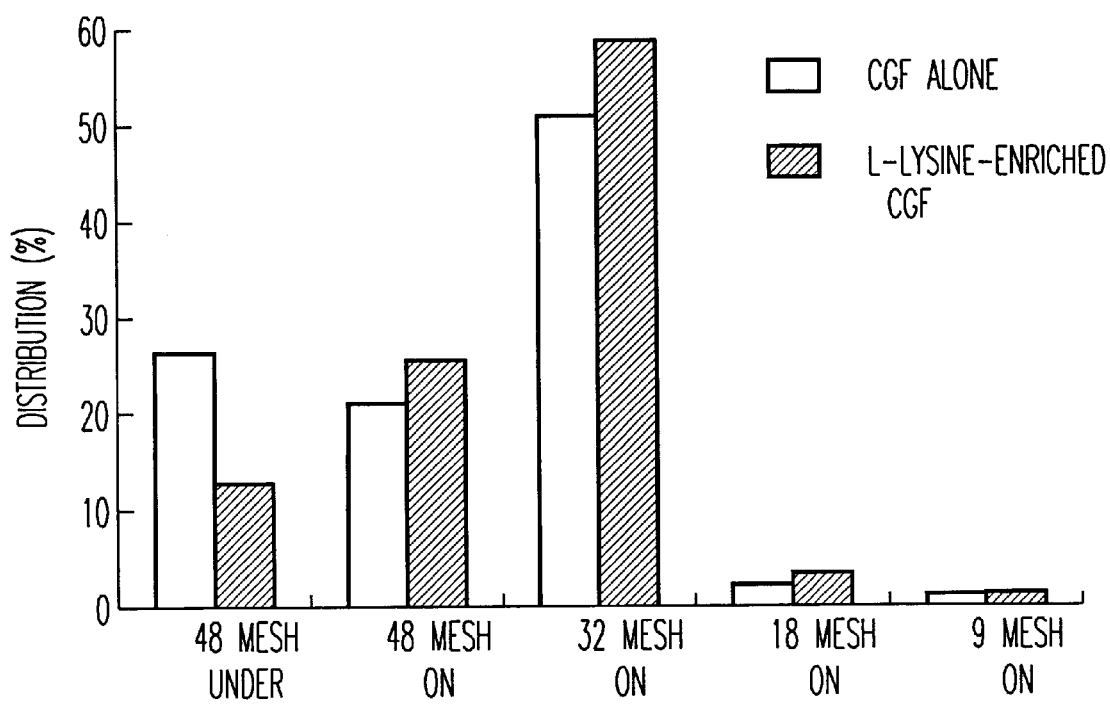
FIG. 2 is a graph showing grain size distribution of L-lysine-enriched CGF of Example 2.

FIG. 2 indicates grain size distribution of L-lysine-enriched CGF. Its bulk density and angle of repose are shown in table b 4. As can be seen from FIG. 2 and table 4, L-lysine-enriched CGF of the present invention has an improved handling property in comparison with the control sample because it caused decrease in the content of a very fine particle and in the angle of repose. Also, it has greater bulk density than control sample to such an extent that a transport cost can be reduced.

TABLE 4

| | L-lysine Sulfate Fermentation Broth-CGF | CGF alone |
|---|---|---|
| Angle of Repose (degree) | 44 | 47 |

TABLE 4-continued

| | L-lysine Sulfate Fermentation Broth-CGF | CGF alone |
|---|---|---|
| Bulk Density (g/cc) | 0.43 | 0.41 |

EXAMPLE 3

A culture medium (pH of 7.0) containing 40 g/L of saccharose, 5 g/L of ammonium sulfate, 2 g/L of $KH_2PO_4$, 20 mg/L of $MnSO_4·7H_2O$, 20 mg/L of $FeSO_4·7H_2O$, 0.4 g/L of $MgSO_4·7H_2O$, 2 g/L of yeast extract and 0.6 g/L of NaCl was seeded with a strain of *Esherichia coli* BK11M B-3996 disclosed in U.S. Pat. No. 5,175,107 and cultivated at 37° C. for 36 hours to prepare a fermentation broth of L-threonine.

The same CGM powder as in Example 1 was used. According to standard tables of feed composition in Japan, the weight ratio of L-threonine to crude protein in CGM is 3.20%.

Next, an experiment for enrichment of L-threonine to CGM was conducted by adding the L-threonine fermentation broth to CGM powder. In this case, the enrichment of L-threonine was targeted to such an extent that the weight ratio of L-threonine to crude protein in soybean cake becomes above 3.78. In this Example, the L-threonine fermentation broth was added to CGM powder in such an amount that the weight ratio of L-threonine to crude protein was attained to above 4%. A fluidized bed agitation granulator ("SPIR-A-FLOW-mini", a product of FREUND INDUSTRIAL Co., Ltd.") was used for the L-threonine fermentation broth to be added, mixed and dried. The L-threonine fermentation broth was added as shown below. 500 Grams of CGM powder was fed into the fluidized bed and then an inlet air flow rate and exhaust air flow rate were adjusted so as to form CGM in a good fluidized state. And, the L-threonine fermentation broth was sprayed thereto with a two-fluid nozzle. The spraying was continued until the weight ratio of L-threonine to crude protein in the threonine-enriched CGM became above 10% as stated previously.

The operating conditions for the SPIR-A-FLOW-mini were the same as those in Example 1.

Crystalline L-threonine-added CGM the preparation of which was conducted by mixing CGM and L-threonine together in dried and powdered state was used as a control sample for evaluating the dispersibility, flowability and bulk density of L-threonine-enriched CGM which was obtained by this means.

Samplings were done at ad lib five places from each of the L-threonine fermentation broth-added CGM and the control CGM, and the L-threonine concentration in the respective samplings was analyzed. The analysis results are shown in table 5.

TABLE 5

| | Amount of L-threonine (Weight Amount of L-threonine Based on Feed) | |
|---|---|---|
| | Addition of L-threonine Fermentation Broth | Control (Addition of Crystalline L-threonine) |
| Sampling 1 | 2.9 | 2.6 |
| Sampling 2 | 2.9 | 2.8 |

TABLE 5-continued

| | Amount of L-threonine (Weight Amount of L-threonine Based on Feed) | |
|---|---|---|
| | Addition of L-threonine Fermentation Broth | Control (Addition of Crystalline L-threonine) |
| Sampling 3 | 2.8 | 2.2 |
| Sampling 4 | 2.6 | 3.1 |
| Sampling 5 | 2.7 | 2.8 |
| Average | 2.8 | 2.7 |
| Standard Deviation | 0.13 | 0.33 |

In the case that L-threonine fermentation broth was added to CGM powder, amino acid was dispersed more homogeneously in CGM in comparison with the case that crystalline L-threonine was added to CGM powder.

Figure 3:
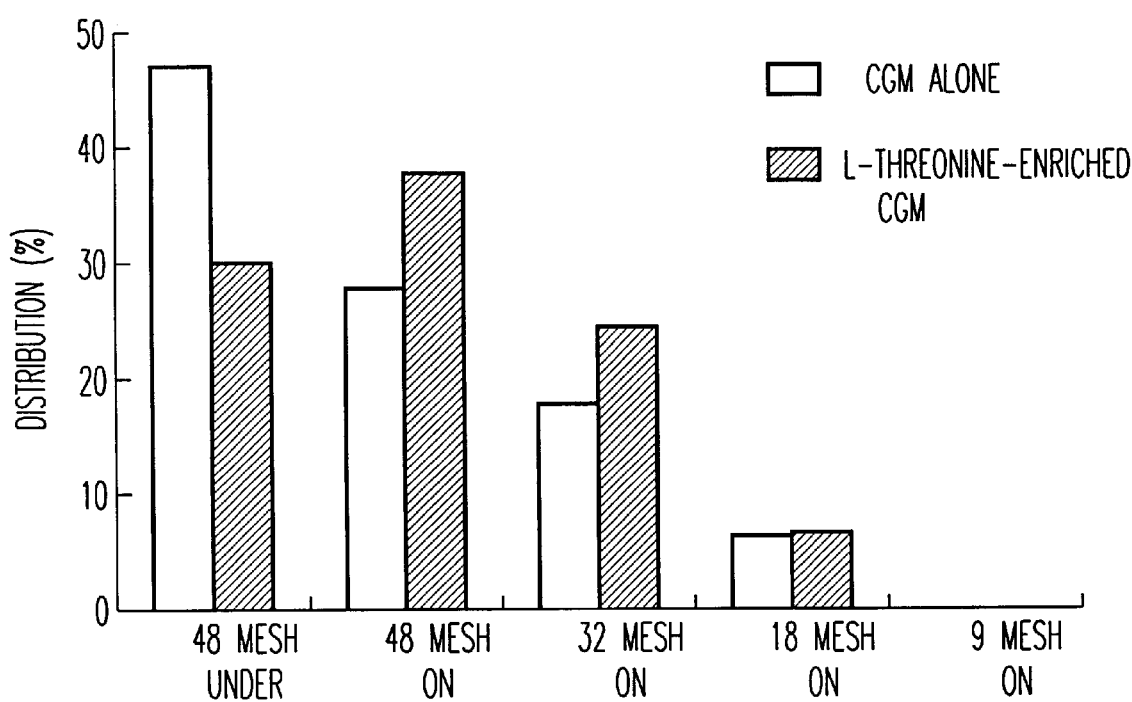
FIG. 3 is a graph showing grain size distribution of L-threonine-enriched CGM of Example 3.

FIG. 3 indicates grain size distribution of L-threonine enriched CGM. Its bulk density and angle of repose are shown in table 6. As can be seen from FIG. 3 and table 6, L-threonine enriched CGM of the present invention has an improved handling property as compared with the control sample because it causes reduction in the content of a very fine particle and in the angle of repose. Also, it has greater bulk density than control sample so that the transport cost can be reduced.

TABLE 6

| | L-threonine Fermentation Broth-CGM | CGM alone |
|---|---|---|
| Angle of Repose (degree) | 39 | 46 |
| Bulk Density (g/cc) | 0.71 | 0.67 |

Effect of the invention:

According to the present invention, there can be provided an amino acid-enriched feed, an industrially produced mixed feed with amino acid or premix thereof, each having homogeneity, excellent handling property and a higher bulk density as compared with the case that crystalline amino acid is mixed with feed.

What is claimed is:

1. An amino acid-enriched feed, industrially produced mixed feed or premix thereof which is obtainable by mixing (a) a feed raw material containing predominantly at least one feed component selected from the group consisting of corn gluten meal powder and corn gluten feed powder with (b) an amino acid fermentation broth containing 3 to 80% by weight of an amino acid or its treated solution and thereafter drying the resultant mixture or by conducting drying during mixing of the raw materials (a) and (b).

2. An amino acid-enriched feed, industrially produced mixed feed or premix thereof which is obtainable by mixing (a) an intermediate product of corn gluten meal powder or of corn gluten feed powder produced in a corn wet milling step with (b) an amino acid fermentation broth containing 3 to 80% by weight of an amino acid or its treated solution and thereafter drying the resultant mixture or by conducting drying during mixing of the raw materials (a) and (b).

3. The amino acid-enriched feed, industrially produced mixed feed or premix thereof as claimed in claim 1 or 2 wherein the amino acid component is L-lysine, L-threonine, L-tryptophane or mixture thereof.

4. A process for preparing an granular feed composition which comprises mixing (a) a feed raw material containing predominantly at least one feed component selected from the group consisting of corn gluten meal powder and corn gluten feed powder with (b) an amino acid fermentation broth containing 3 to 80% by weight of an amino acid or its treated solution and thereafter drying the resultant mixture or conducting drying during mixing of the raw materials (a) and (b).

5. A process for preparing an granular feed composition which comprises mixing (a) a feed raw material containing predominantly an intermediate product of corn gluten meal powder or of corn gluten feed powder produced in a corn wet milling step with (b) an amino acid fermentation broth containing 3 to 80% by weight of an amino acid or its treated solution and thereafter drying the resultant mixture or by conducting drying during mixing of the raw materials (a) and (b).

6. A process as claimed in claim 4 or 5, wherein the amino acid component is L-lysine, L-threonine, L-tryptophane or mixture thereof.

7. A process as claimed in claim 4 wherein drying involves a fluidized bed drying, a drum drying, a spin flash drying or agitation drying.

* * * * *